United States Patent [19]

Kraushaar et al.

[11] 4,156,109

[45] May 22, 1979

[54] ELECTRONIC TRAFFIC MEASURING, SORTING, AND RECORDING DEVICE

[76] Inventors: Jonathan M. Kraushaar, 7610 Allman Dr., #302, Annandale, Va. 22003; Ramses R. Mina, 301 N. Beauregard St., #604, Alexandria, Va. 22312

[21] Appl. No.: 842,303

[22] Filed: Oct. 17, 1977

[51] Int. Cl.² ............................................ H04M 15/00
[52] U.S. Cl. ..................................................... 179/8 A
[58] Field of Search ................. 179/7 R, 7.1 R, 7 MR, 179/7.17 P, 8 R, 8 A, 175.2, 175.21, 175 R, 175.23

[56] References Cited

U.S. PATENT DOCUMENTS

| | | | |
|---|---|---|---|
| 3,231,866 | 1/1966 | Goetz et al. | 179/7 |
| 3,324,241 | 6/1967 | Bachelet | 179/8 A |
| 3,868,480 | 2/1975 | Mungio et al. | 179/8 A |
| 3,959,593 | 5/1976 | Mehta | 179/8 A |
| 4,022,978 | 5/1977 | Connell et al. | 179/8 A |

*Primary Examiner*—Kathleen H. Claffy
*Assistant Examiner*—Gerald L. Brigance

[57] ABSTRACT

The invention described is an electronic device for traffic measurement in telecommunication networks. The device measures the two main parameters of the carried load, known mathematically as the mean and variance of the number of calls in progress from which the mean of the offered load and its peakedness are calculated by mathematical formulas. The device monitors continuously the service channels and records the highest load in a period of sixty consecutive minutes or part thereof. The device also records the number of times when all the service channels are busy or when a certain threshold is reached and provides the facility to record the load during individual group busy hour as well as during the cluster busy hour. (A cluster is defined as a number of cooperating trunk groups with coincident or noncoincident busy hours.)

This invention is further believed to be the first attempt to obtain an accurate estimate of the offered load and its peakedness from mean and variance statistics of load carried on a sampled portion of the total number of trunks in each trunk group. Therefore it represents a new concept and significant departure from present-day traditional methods which date back to the Twenties.

13 Claims, 6 Drawing Figures

ELECTRONIC TRAFFIC MEASURING, SORTING, AND RECORDING DEVICE

BACKGROUND OF THE INVENTION

In a telephone plant the data required for sizing plant requirements and for monitoring the grade of service in its various parts consist mainly of three main types: Usage, congestion, and number of calls. Three different facilities are usually used to collect that data. The facility for usage measurement consists of traffic usage recorders of which various electromechanical and electronic types are available on the market. They can be broadly classified into two main categories, analog and digital. In the analog, the sum of the current drain of busy circuits is continuously recorded. In the digital, the circuits are scanned at regular intervals and the number of busy circuits (called busies hereafter) is scored on digital counters which sum their number during a period of one hour. The measured load is expressed in convenient units of telephone traffic such as CCS (hundred-call-seconds) or Erlangs.

Various measurements also are used for the monitoring of call congestion. These are: peg count, overflow, all trunks busy (ATB) and last trunk busy (LTB). Overflow measurement consists of scoring the number of call attempts which arrive when all the circuits in the group under consideration are occupied. The ratio of such unsuccessful call attempts to all call attempts (which are measured by a peg count counter) is called the grade of service or percent of no circuit (%NC), and is used as a measure of congestion. Theoretically, the grade of service is defined as the limit (as time increases without bound) of the ratio of the overflow and peg count counter readings. In ATB measurement one counter per group of trunks measures the duration of the all trunks busy (ATB) condition. Similarly, in LTB measurement a counter measures the duration of the last trunk busy condition. The grade of service can then be obtained from that data by mathematical formula. The accuracy of congestion measurement by these methods is very poor due to the practical limitation of the observation period. Moreover, they are only applicable to full availability trunk groups.

The facility for measuring the number of calls consists of call counters which score the number of call attempts. Usage can be estimated as the product of the number of calls and their average duration, a quantity that is obtained by another type of measurement.

The above mentioned methods were used traditionally since the Twenties. They served their purpose until the introduction of automatic alternate routing in the Long Distance Dialing Network in which final routes are offered "peaked" traffic identified with variance greater than the mean, as opposed to random traffic identified with variance equal to the mean. Peaked traffic requires more service channels than random traffic for the same load and grade of service. The ratio of the variance to the mean of the offered traffic is called the peakedness factor (PF).

At present, estimates of the offered load and its PF are made from usage and %NC (no circuit) data. Due to the limitation of the observation period and the presence of retrials (reordered calls), especially at times of congestion, the reliability of the estimate by this method is very poor, besides being costly. Moreover, usage measurement as described above is subject to another inherent inaccuracy, in that the load is measured during fixed hourly periods rather than during moving or sliding hourly periods. (Theoretically, the busy hour load is defined as the maximum load during a period of sixty consecutive minutes or part thereof.) Add to this the difficulty in practice of updating (augmenting) the measuring leads with changes in trunk group size and the processing effort of a voluminous amount of measured data.

This invention by means of a new conceptual approach cures the infirmities of present-day methods and has the following salient advantages:

(1) Provides the mean and variance of the number of calls occurring in a period of 60 consecutive minutes or part thereof during periods of highest traffic intensity.

(2) Provides the mean and variance of the load in cooperating groups of trunks forming a cluster which may have non-coincident busy hours during the significant cluster busy hour.

(3) Provides estimate of the mean and variance of the offered load and its blocking probability with greater accuracy. While the method of calculating the offered load and its variance from the mean and variance of carried load on a selected group of trunks is known, no device for practical application of the theory is believed to exist.

(4) Provides economy in the cost of traffic measurement by limiting the measurement to a limited number of trunks which are arranged to be used at last-choice trunks. The measuring leads will therefore be permanently connected to the device and need not be changed with trunk group growth. This overcomes the present difficulty of rearrangement of the measuring leads.

(5) Provides the facility for monitoring, not only overload conditions to guard against service deterioration, but also for monitoring plant overprovision, a feature which is required in a monopolized public service. The load carried by the last-choice trunks provides tangible evidence of plant overprovision or underprovision. Present systems do not effectively provide the facility to measure overprovision.

SUMMARY OF THE DEVICE

The device to be described obviates the need for the three types of devices used at present for traffic measurement, namely usage, overflow, and peg count measurements. The device is relatively simple and with the present state-of-the-art should be quite inexpensive to implement.

This invention has two main features. First, it enables simultaneous measurement of both the mean and variance of the calls carried by selected trunk groups, circuits, or switches, from which the offered load, its peakedness and blocking probability can be rigorously estimated by mathematical formulae. Second, it provides measurement of the load carried for any period of sixty consecutive minutes of fraction thereof during periods of highest traffic intensity. Moreover, it provides the facility of measuring the traffic in cooperating groups of trunks forming a network cluster during the significant busy hour of the cluster, without the need for massive data storage and manipulations. In that sense the recording device is also a compact calculating and sorting device for online selection of significant data. This will result in significant reduction in downstream data processing required for correctly sizing the quantity of trunks. The device provides the facility for monitoring not only overload conditions to guard against service deterioration but also for monitoring plant overprovision in a monopolized public service.

While the principle of this device can be applied to any number of trunk groups, and number of sampled trunks per group, and any number of hourly samples, for the sake of clarity the implementation shown in the detailed description to follow is for 8 groups each with 32 hourly samples. Modification to change these capacities should be evident based on the description herein, to anyone skilled in the art.

FIG. 1 shows the block diagram of the device and its main functional components.

Operation of the invention centers around two random access memory systems. The key to understanding the function of the device is to perceive the data storage and arrangement in these memories. The first memory, called the main data memory, is divided into data blocks, one for each trunk group, with a number of samples per block. In the following description 32 samples per block are used, but other members of samples can be used. Each block contains the data for the most recent hourly load measurements on each trunk group. The data blocks, each with 32 samples, are stored in adjacent portions of the memory. The details of how the data is written into and retrieved from this memory will be discussed shortly, as this represents a significant aspect of the invention.

The other memory system, referred to herein as the data summary memory stores the sum and sum of squares of the busies over the 32 hourly samples. Thus, a minimum of two memory locations is required for each trunk group.

The two methods by which these memories are updated is also a key aspect of the invention. Updating by the first method is accomplished by looking at a cluster of the trunk groups as a whole and updating the data for the individual trunk groups immediately after the current hourly load exceeds previous loads. In the second method updating occurs for each trunk group individually when its current hourly load exceeds previously recorded loads.

The sum of the busies and the sum of their square accumulated in the data summary locations can easily be used to calculate the mean and the variance of the load carried by each group in its individual group busy hour and the cluster busy hour.

It is helpful to separate the invention into two functional parts. The first part concerns storage of the busies for each trunk group in the main data memory for the 32 hourly samples when old measurements are cyclically replaced by new ones. The completion of this cycle occurs after all 32 samples in the one hour period have been stored for all groups. The sets of 32 stored busies for each group may be viewed as data blocks in the memory. The second part retreives the data stored in the main data memory, one at a time, and calculates the required statistics of the sets of 32 measurements at the proper time and stores the processed data in the summary memories. This data represents the sum of the 32 busies and the sum of their squares for the group and cluster busy hours of each trunk group. This function is accomplished by three accumulators: the first sums the 32 samples per group, the second sums the squares of these samples, and the third sums the 256 samples of the cluster consisting of 8 groups, in this case. The accumulator for the 256 cluster samples works with a latch and comparator arrangement so that the latch contents are updated when a new accumulated total is larger than any previous one. The signal (pulse) which is present when this condition occurs, sets a flip flop and causes all data in the data summary memories to be updated for all trunk groups, during the next read cycle. Thus, the data stored in the data summary memory represents the load on the individual trunk groups at the cluster and/or group busy hours.

All address and timing functions are obtained from a set of two binary counters in tandem. These are conceptually viewed as two read counters which read data from the main data memory and two write counters which update the main data memory. (Together they may be viewed as one large 16 bit counter.) Timing is such that the write counter goes through its entire counting cycle in one hour. An entire main memory readout scan takes place between each data element update, since the write (data update) counter is driven by the output (highest bit position) of the read counter. In the read counter all the data elements of a given data block are counted before a new group data block is selected. A multiplexer selecting the group to be measured (sampled) is driven from the group counter portion of the write counter. In the detailed description further explanation of how the other timing functions, such as resetting and enabling the accumulator, will be given.

Two decoders will also be described in further detail in the detailed description. One of these converts actual inputs from the trunk measuring leads to a binary output, indicating how many trunks are busy. The other decoder converts a binary number into its square. While these decoders are shown for clarity and simplicity as Read Only Memory (ROM) elements in the detailed description, they could be replaced by active calculating elements.

DETAILED DESCRIPTION OF THE INVENTION

Novelty of the device described herein is based on the following new concepts:

(1) Direct measurement of statistics yielding both the mean and the variance: Traffic distributions, that is the manner in which calls arrive to a telephone network, are identified by parameters, called by mathematicians moments, of which the first two, the mean and the variance, are used by traffic engineers. The mean is usually expressed in units of telephone traffic such as CCS (Hundred-Call-Seconds) or the Erlang. In present-day systems, a separate counter per group of circuits is usually provided which scores the sum of the number of the busy circuits (called busies) for all scans in one hour. The new concept requires storage of the busies at each scan in the current hour as well as their sum and the sum of their squares from which the mean and the variance are calculated by mathematical formula. Use of sums and sums of squares of such busy measurements, yielding the means together with variance eliminates the need for a separate facility such as overflow and peg count counters for the measurement of offered traffic loads and the grade of service. (2) Group Busy Hour: The group busy hour is defined as the hour of highest traffic intensity in the group under consideration. Theoretically, it is the consecutive sixty minutes during which the sum of the business is maximum. Due to practical limitations of present systems, the measurement is made for a number of groups during set hours starting on the hour or half hour. This may result in measurement inaccuracy, particularly when peak traffic intensity occurs in hourly intervals which do not exactly coincide with the measuring system. The new concept utilizes a so-called moving hour to determine the group busy hour by updating a main data memory at every scan along with the hourly sum counter or accumulator. Current sums thus represent the traffic for the hourly interval of highest traffic intensity, whenever that hour occurs. The device can also be adapted using the techniques described to determine busy season traffic which is defined as the season during which the sum of twenty consecutive busy hours (or more) is maximum.

Figure 5A:
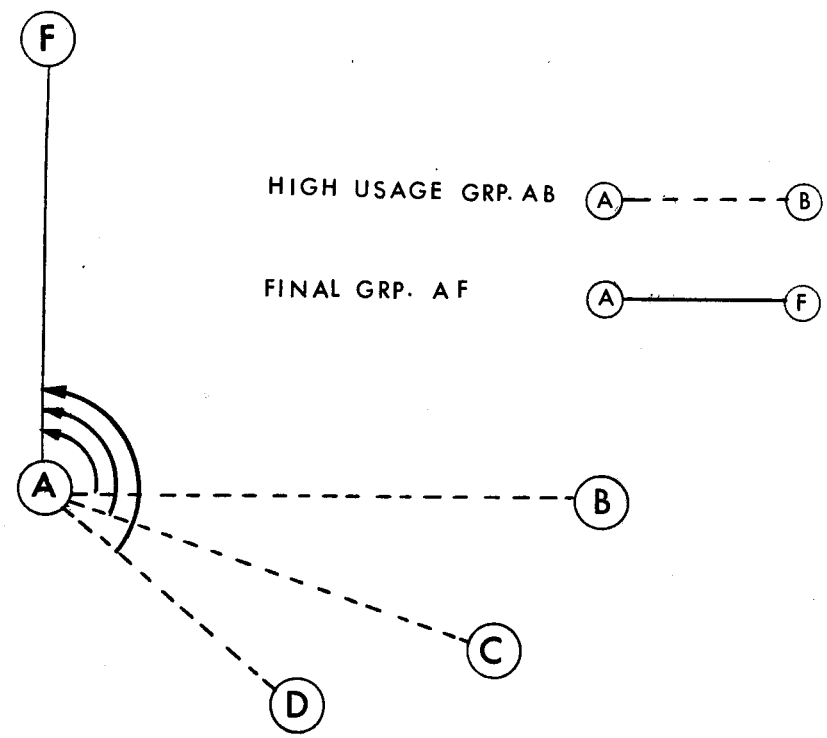
FIGS. 5a and 5b are illustrative sketches for illustrating the network structure where the invention might be used and the significant parameters for the mathematical calculation.

(3) Measurement of traffic during the cluster busy hour: The cluster busy hour is defined as the hour during which the traffic intensity in a number of cooperating groups (which may have non-conicident group busy hours) is highest. FIG. 5a depicting a simple alternate route network is used to illustrate the principle of the cluster busy hour. The network consists of three high usage (HU) groups AB, AC, and AD shown as dashed lines and one final group AF shown as a solid line. The traffic that cannot be handled by the HU groups is offered to the final group. That traffic depends on the cluster busy hour of the three HU groups. The device produces the mean and the variance for each group in the group busy hour as well as in the cluster busy hour. This is done by providing a counter (accumulator) to store the sum of the busies in the cluster of all groups similar to the individual group sum. It is believed that this is the first device that can provide means for the accurate measurement of the mean and the variance in cooperating groups having non-coincident busy hours.

(4) Indication of plant shortages or overprovision: The device provides indication when certain traffic thresholds are reached. This is done by limiting the measurement to a limited portion of the trunks which are arranged to be used as last choice. The traffic intensity in the last choice group can be used as an indicator of plant shortage resulting in traffic congestion, or plant overprovision resulting in waste. The limitation of the measuring leads to the last choice group also has the important advantage of eliminating the need to update the measuring leads with trunk additions. The measuring leads can thus be permanently cabled to the device.

The device to be described measures and stores statistical information concerning the traffic or load on a number of trunk groups by measuring the following five parameters on a selected set of trunk leads from each trunk group: (The description herein will generally refer to 8 trunk groups with 8 sampled trunk leads and 32 hourly samples.)

(1) The sum of the number of trunk busies in each trunk group for the 32 samples during the hourly period of highest traffic intensity on each group (trunk group busy hour).

(2) The sum of the squares of the above measurements in (1) above.

(3) The sum of the number of trunk busies in each trunk group counted as (1) above except that the count is recorded for the hourly period of highest intensity in the cluster of these trunk groups (cluster busy hour.)

(4) The sum of the squares of the measurements in (3) above.

(5) The sum of the 32 samples of trunks simultaneously busy in the 8 groups for the busiest hourly period (cluster busy hour).

A clear understanding of these five measurements is necessary for proper understanding of the remaining portion of this specification.

Figure 1:
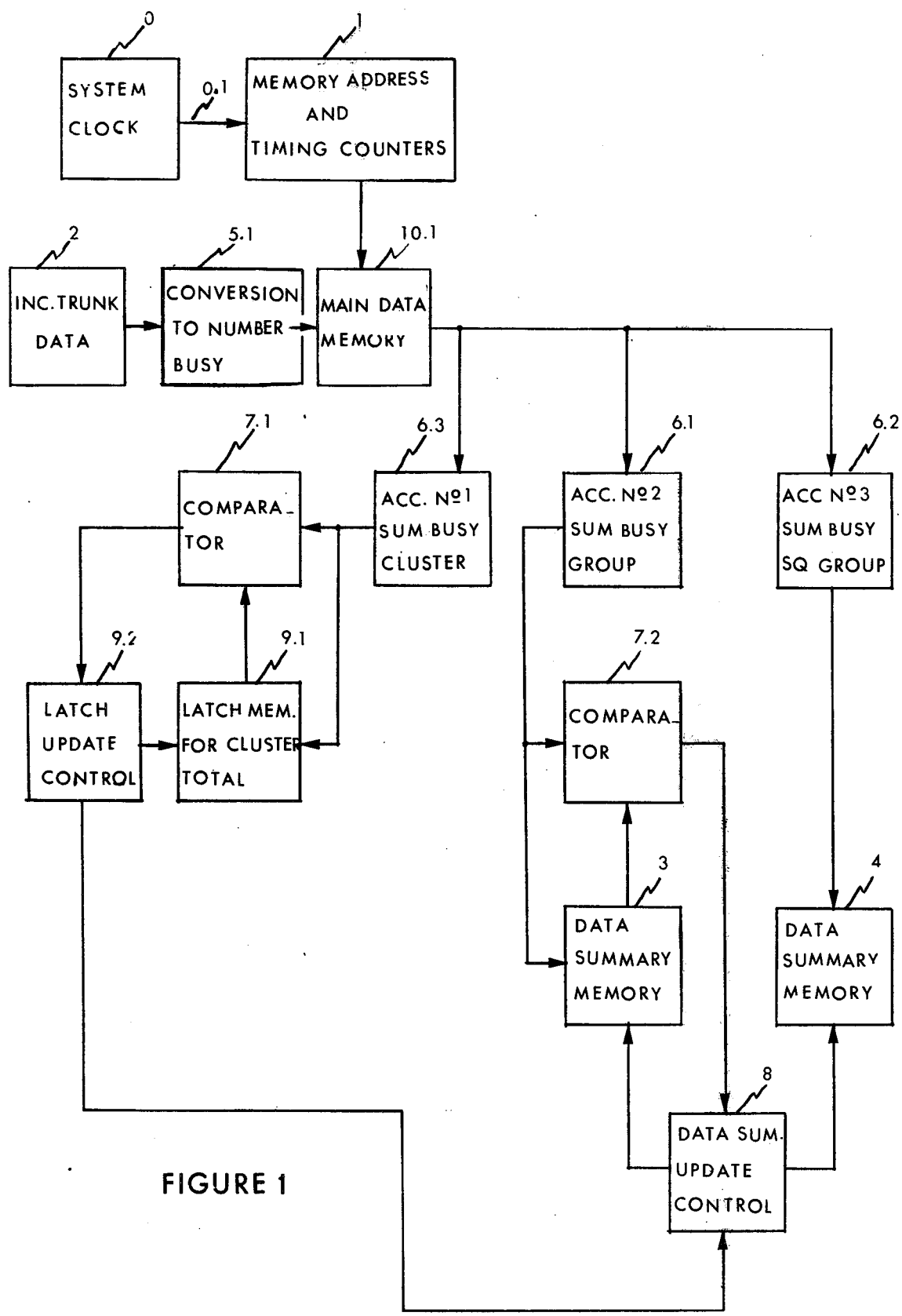
FIG. 1 is a block diagram showing the general interaction of system components.
Figure 2:
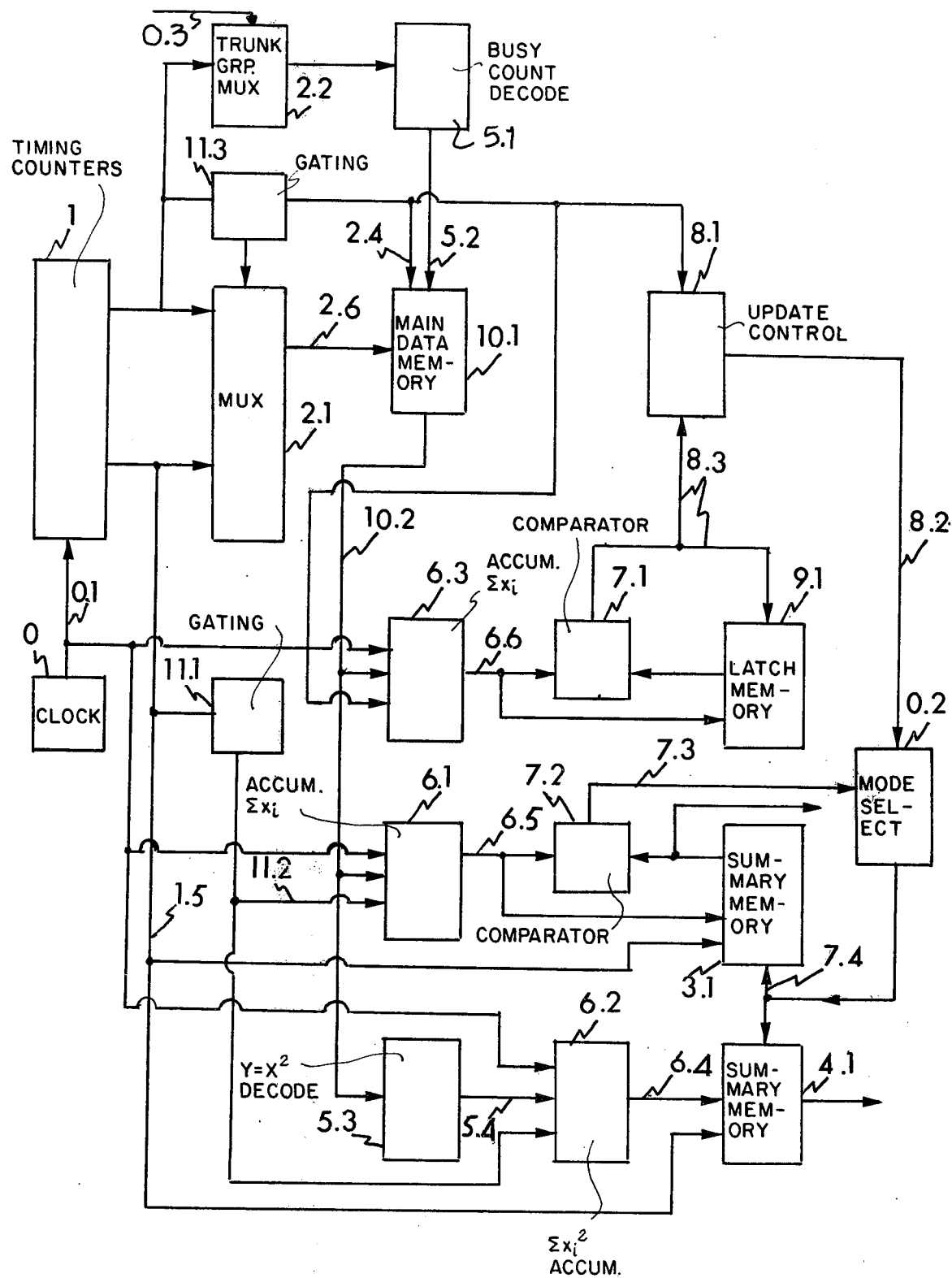
FIG. 2 is a more detailed block diagram showing all key components and their interconnection.
Figure 3:
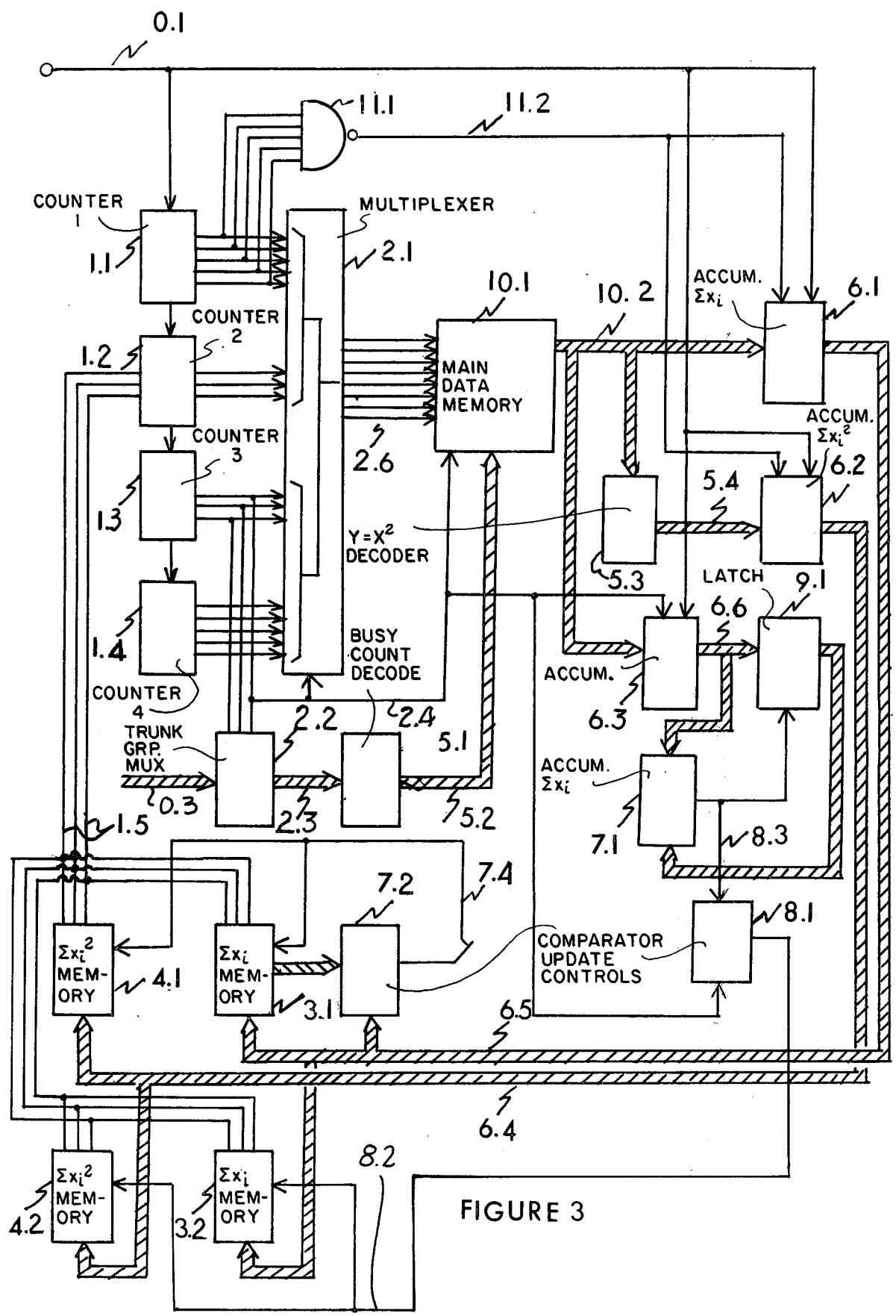
FIG. 3 is a detailed drawing of all connections which also differentiates between bus lines and individual connecting lines.

The traffic measuring and recording device consists of several main components depicted in the block diagrams of FIGS. 1 and 2. Before getting into the detailed description of these components and their interaction, it will be useful to make some general remarks about the figures. FIG. 3, depicting detail of the entire system shows both narrow and wide connecting lines. The broad shaded lines represent buses or a number of leads and are used to avoid unnecessary crowding on the drawing. Single leads are shown as single lines where such detail is required. The numbering system used is designed to categorize those components and leads associated with a specific function. It consists of two numbers separated by a decimal point. The number to the right of the decimal point in the figures refers to a specific subassembly, or portion of that main component. In FIG. 3 it should be noted that three leads (1.5) emanating from both sides counter (1.2) are connected to the same terminals of the counter. Certain terms used in this specification such as main data memory, and data memory are meant to identify and conceptually illustrate certain parts of the invention and therefore gain significance in the context in which they are used.

It should be pointed out that the specific configuration shown can easily be modified to allow measurement of a larger number of groups or a larger number of measuring leads per group. As mentioned earlier, eight groups with 8 measuring leads per group were chosen for the purpose of this illustration. Most applications would probably require a large number of measured groups than are shown here. It may also be desirable to increase or decrease the number of samples per hour from the 32 depicted here; however, according to the literature, the time interval between successive samples should be less than the average call holding time for measurement accuracy.

The main components of the invention are depicted in FIG. 1 and are described generally first. The system clock (0) with a minimum pulse repetition rate of $8 \times 32$ squared, or 65536 pulses per second in this illustration (the number of groups times the number of samples per hour, all squared) drives a set of 4 serially connected counters (1), providing the memory address and overall timing functions. These counters determine the memory location in which current trunk group data is written into (and read from) and selects the trunk group of interest at any given time. The main memory (10.1) stores 32 samples (no. trunks busy) over an hourly period for each trunk group. The exact addressing (timing)

sequence and memory location configuration will be discussed later in this description.

Incoming trunk leads (2), illustrated in FIG. 1 as incoming trunk data are used to address a ready only memory (ROM) (5.1) which decodes or converts the number of busies into 4 bit binary code which provides the data input for the main data memory (10.1). Some sort of input buffering will be required for typical trunk measuring leads so that voltage levels are compatible with the digital logic levels used.

One of the key features of the invention is that data from only a small number of trunk leads need be measured and stored in the main data memory to obtain offered load to the entire group of trunks. This is made possible by telephone traffic theory and knowledge of telephone traffic statistics, as will be illustrated later in this description.

Periodically, the data contained in the main data memory is accumulated by trunk group to provide a sum of the busies and a sum of their squares in an hourly period. These parameters are used with the mathematical technique to be illustrated later in this specification in order to calculate the parameters of offered load, expressed in traffic units of Erlangs or CCS.

The general steps based on FIG. 1 describing the sequence of operation are as follows:

(1) Read 32 elements from main data memory (10.1) with enable pulse to accumulator through lead (0.1) from clock (0) between successive elements;

(2) Transfer data from accumulators (6.1), (6.2), to data summary memories (3), (4), when contents accumulated exceed stored contents of data summary memory or when data summary memories are put in write mode;

(3) Reset accumulators (6.1), (6.2);

(4) Switch main data memory to write mode and update 1 element in main data memory from measured trunk leads (2);

(5) Switch data memory back to read mode and repeat process above.

Accumulators (6.1), (6.2), and (6.3) are used to produce the sum of the busies and the sum of their squares in each trunk group, and the sum of the busies in all trunk groups, relatively during the hour of interest. The two data summary memories (3) and (4) in FIG. 1 are used to record for each trunk group the largest value of the sum of the busies referred to herein as $$(\sum_i X_i)$$

and the sum of the busies squared $$(\sum_i X_i^2)$$

respectively for each measured trunk group. Latch memory (9.1) stores the sum of the busies for all trunk groups combined and is updated periodically so as to retain the largest sum.

Comparators (7.1) and (7.2) enable the contents of the data summary memories (3) (4), and latch memory (9.1) to be updated when current sums of busies exceed previously stored sums. The data summary update control (8.1) is used to select whether updating by cluster or group is required. The choice of updating mode or technique gives the device more flexibility in a variety of applications.

Accumulators (6.1), (6.2), and (6.3) have three input ports and one output port as shown in FIG. 3. Accumulator reset lead (11.2) connects to the reset inputs of accumulators (6.1) and (6.2). When all leads from the read counter element selector (1.1) are at low logic level, the output of NAND gate (11.1) is high and the accumulators (6.1) and (6.2) are reset. Accumulator (6.3) is reset through lead (2.4) from the lower order bit of the write counter group select (1.3). Four output (bus) leads (10.2) from the main data memory (10.1) serve as data inputs to accumulator (6.1) and (6.3). Similarly, at least seven output (bus) leads (5.4) from the squaring decoder (5.3) serve as inputs to accumulator (6.2).

The "enable" inputs to the accumulators (6.1), (6.2) and (6.3), which cause the inputs on buses (10.2) and (5.4) to be added to the existing total, are connected to the system clock through lead (0.1) so that running totals can be made after each element in the main data memory is read. The accumulators would add indefinitely until they are reset through lead (11.2), as referenced above. Accumulator output bus (6.5) connects to the data input ports of the (RAM) data summary memories (3.1) and (3.2). Accumulator (6.1) has at least eight output bus leads (6.5) to accomodate totals of up to 256 (8 trunks per group times 32 samples). Accumulator (6.3) has at least eleven output bus leads (6.6) to accomodate a count of 2048 (256 as above times 8 trunk groups). Accumulator (6.2) has at least eleven output bus leads (6.4) to accomodate a count of up to 2048 (8 busy trunks per group squared times 32 samples).

Latch memory (9.1) stores a single (eleven bit) word of data. Lead (8.3) switches the latch to the read or write mode. The data summary memories (3.1) and (3.2) store eight data words (one per trunk group) of eight bits each from accumulator (6.1) and the data summary memories (4.1) and (4.2) store eight data words of eleven bits each from accumulator (6.2). The data summary memories are switched between read and write modes through leads (8.2) and (7.4). Data can be retrieved from these memories for each group by driving address leads (1.5) through all binary states and placing the memories in the read mode. To avoid crowding in the figure output leads from the data summary memories (3.1), (3.2), (4.1), and (4.2) are not shown.

Table I

| Main Data Memory Read/Write Sequence | | | |
|---|---|---|---|
| A. Read Sequence--Transfer of Data from Main Data Memory to Data Summary Memory | | | |
| Group # | Element # (Hourly Samples) | Leads from Binary Group Counter (1.2) | Leads from Binary Element Counter (1.1) |
| 1 | 1......32 | 001 | 00000 to 11111 |
| 2 | 1......32 | 010 | . |
| 3 | 1......32 | 011 | . |
| 4 | 1......32 | 100 | . |
| 5 | 1......32 | 101 | . |
| 6 | 1......32 | 110 | . |
| 7 | 1......32 | 111 | . |
| 8 | 1......32 | 000 | 00000 to 11111 |
| B. Write Sequence--Update Main Data Memory from Trunk Measurements (1 element updated after each read cycle) | | | |
| Element # | Group # | Leads from Binary Element Counter (1.4) | Leads from Binary Group Counter (1.3) |
| 1 | 1......8 | 0 0 0 0 1 | 000 to 111 |
| 2 | 1......8 | 0 0 0 1 0 | . |

Table I-continued

| | Main Data Memory Read/Write Sequence | | |
|---|---|---|---|
| 3 | 1.......8 | 0 0 0 1 1 | |
| 4 | 1.......8 | 0 0 1 0 0 | |
| 5 | 1.......8 | 0 0 1 0 1 | |
| 6 | 1.......8 | 0 0 1 1 0 | |
| . | . | . | |
| . | . | . | |
| . | . | . | |
| 31 | 1.......8 | 1 1 1 1 1 | 000 to 111 |
| 32 | 1.......8 | 0 0 0 0 0 | 000 to 111 |

To further understand the detailed operation described below, it is useful to subdivide the function of the device into two basic areas. These are data collection and preliminary sorting/processing. The invention enables the simultaneous observation of a number of separate trunk groups by a specially developed technique for sampling the busies on a number of trunk groups during a moving hourly period. As stated earlier, a limited number of trunk leads from each trunk group are monitored, from which the offered load to the entire group is derived using a mathematical algorithm illustrated at the end of this specification.

The data collection system is pictured in FIG. 4 and will be discussed first. A set of four binary counters connected serially (1.1), (1.2), (1.3), (1.4) and in effect forming one large 16 bit counter, provide the required timing and addressing functions. The system clock (0) drives two serially connected read counters (1.1) and (1.2). These read counters are used to control the summarization (by the accumulators) of the 32 memory locations in the main random access (RAM) memory (10.1) for each trunk group and their storage in the data summary memories (3) and (4). The first (element selecting) read counter, (1.1), selects the 32 sampled hourly elements (measurements of trunk busies) stored in the main memory (10.1) for each group, and the group select read counter (1.2) selects a new group to be read from, after all 32 elements of the previous group have been read. Gate (11.1) provides a pulse to the accumulators to reset them after the 32 samples have been read for each trunk group. The group select read counter (1.2) also drives the address leads for the data summary memories (3) and (4) so that the summarized statistical data from the 32 locations for each group in the main data memory will be stored in a specific location in each of the data summary memories. One data summary memory (3) stores the sum of the 32 values for each group and the other data summary memory (4) stores the sums of the squares of the same 32 data values for each of the eight groups.

After each read cycle, which allows the data from the 32 samples from each group in the main data memory to be stored in the data summary memories, (3), (4), the main data memory (10.1) is shifted to the write mode through lead (2.4) and the multiplexer, (2.1) selects the leads from the write counters (1.3) and (1.4) to address the main data memory. Note that in the drawing lead (2.4) is connected to the lowest order bit of the write counter (1.3) to accomplish this. Additional gating (11.3) between the outputs of counters (1.1), (1.2), (1.3) and (1.4) and lead (2.4) could easily be used to switch the main data memory (10.1) between the read and write modes at a different time in the operating cycle. In effect, the multiplexer (2.1) connects the address leads of the main data memory (10.1) to the read counters (1.1) and (1.2) when the main data memory is in the read mode, and to the write counters (1.3) and (1.4) when the main data memory (10.1) is in the write mode. In this way, data can be stored in the main data memory (10.1) in a different sequence than its retrieval.

Figure 4:
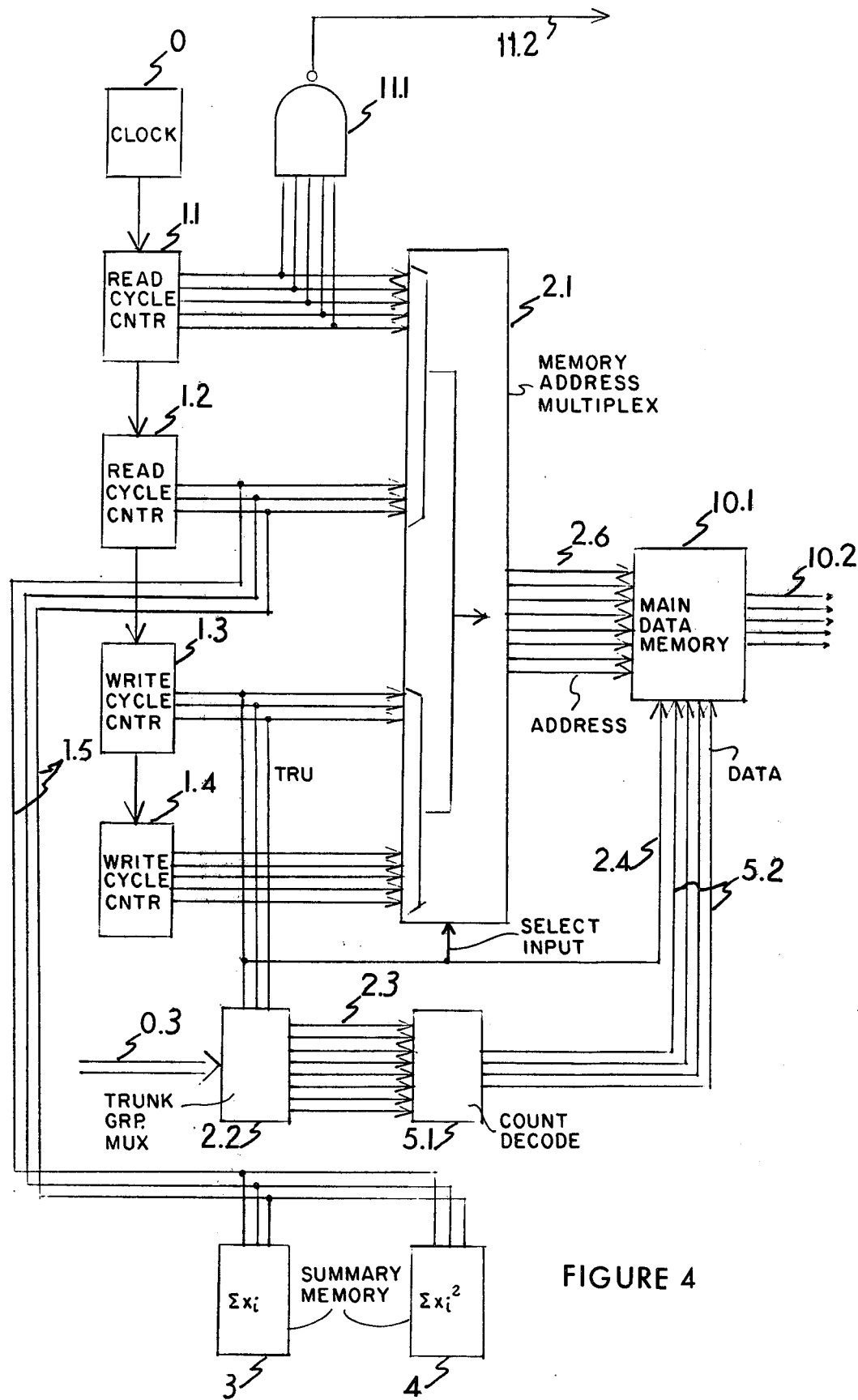
FIG. 4 is a detailed drawing of the data collection and memory system with timing counters and trunk group multiplexer.

As shown in FIG. 4, the write counters are driven by the read counters so that data from all 8 groups of 32 elements each are summarized (read mode) before a single element is updated (write mode). Table I illustrates the arrangements of the data blocks in the main memory and how the 32 elements for each group contained in a data block are read out and updated. The counters (1.1), (1.2), (1.3), (1.4), multiplexer (2.1), and RAM main data memory (10.1) thus form a straightforward arrangement enabling a systematic means for updating the main data memory and extracting data from it. This technique minimizes the size of the main data memory required, and because the entire read/write cycle takes place in an hour, the main data memory stores only a single moving hour of data. As will be shown, this allows the extraction of data from the main data memory during the hour of highest traffic intensity either on the basis of individual trunk groups or on the basis of all trunk groups (in a cluster) taken as a whole.

It should be noted that incoming trunk leads (0.3) seen in FIG. 4 (which are at high or low logic level corresponding to busy and nonbusy conditions by means of external interfacing circuitry) from the individual groups must be selected for measurement. This is accomplished by trunk group multiplexer (2.2) which selects trunk leads from each individual trunk group in sequence when a new storage location in the main data memory (10.1) is to be updated. The 8 output leads (2.3) from the trunk group multiplexer, representing the leads from one of the measured trunk groups, will be either at the high or low logic level. Whether a busy trunk lead is denoted by a high or low logic level would be determined by the interfacing used to convert voltage levels on trunk measuring leads to voltages corresponding to binary digital logic levels. For the purpose of discussion, however, it will be assumed that a busy trunk is at a high logic level. The 8 trunk leads measured are then decoded into logic levels on 4 leads using a ROM (Read Only Memory) type of decoder "programmed" so that logic levels on output leads (5.2) correspond to the number of the 8 leads from the multiplexer at high logic level. The details of the coding scheme for the ROM decoder from this description should be obvious to anyone skilled in the art; however, a short sequence of input/output combinations is shown below as an example to illustrate the idea. The numeral "1" (one) represents a high logic level and "0" (zero) represents a low logic level.

| Measured binary levels on trunk leads (Input address leads of ROM decoder) (2.3) | # Trunks Busy (# is on address leads) | Binary representation of # trunks busy (output leads of ROM decoder) (5.2) |
|---|---|---|
| 0 1 1 0 0 0 0 0 | 2 | 0 0 1 0 |
| 0 1 0 0 0 0 0 0 | 1 | 0 0 0 1 |
| 0 0 0 0 0 0 1 0 | 1 | 0 0 0 1 |
| 1 1 1 1 1 1 1 1 | 8 | 1 0 0 0 |
| 0 0 0 0 0 0 0 0 | 0 | 0 0 0 0 |
| 0 0 0 0 0 1 0 1 | 2 | 0 0 1 0 |

The preliminary data processing system is depicted in FIGS. 2 and 3. FIG. 2 illustrates all interconnecting lines and the more detailed FIG. 3 illustrates those interconnections which are bus lines. The purpose of this logic system is to reduce or summarize data stored in the main data memory between successive updates of that data. Summary data entered in the data summary memories (3.1), (3.2), (4.1), and (4.2) in FIG. 3 is reduced from the data stored in the main data memory (10.1) in two ways. First, only two elements are produced for every 32 in the main data memory, namely the sum of the busies, stored in data summary memories (3.1) and (3.2), and the sum of the busies squared, stored in data summary memories (4.1) and (4.2). It should be noted that the data summary memories (3.1), (3.2), (4.1), and (4.2) are illustrated in FIGS. 1 and 4 by the blocks (3) and (4). Second, storage and updating in the data summary memory only occurs when current values of the sums of the busies exceeds those previously recorded. It should be clear that the advantages of this system lie in the fact that large amounts of raw data in the main data memory (10.1) are reduced into manageable size in the data summary memory for further processing, vastly reducing the memory requirements for continuing operation. The main data memory (10.1) need not be excessively large, as it always contains only the most current hourly data, with data more than one hour old being replaced with current data. The data summary memory system has, in effect, intelligence to choose (sort) the data in the main data memory which it will summarize and store. The detail of this process is described below.

The preliminary data processing system depicted in FIG. 1 consists of the following components: Comparators (7.1) and (7.2); accumulators (6.1), (6.2), (6.3); data summary memories (3), (4), with further detail (3.1), (3.2), (4.1), (4.2) in FIGS. 2 and 3; data summary memory update control (8); latch memory (9.1); and latch memory update control (9.2).

Referring now to FIGS. 2 and 3, one sees two accumulator-comparator-memory systems. The first of these consists of accumulator (6.3), which totals the busies in all trunk groups (cluster) over the one hour period, latch (9.1) which stores the largest accumulated sum of one hour data measurements from accumulator (6.3), and comparator (7.1) which updates data stored in the latch (9.1) by determining when the current total stored in accumulator (6.3) exceeds the largest previously stored total in the latch (9.1). Accumulator (6.1), data summary memory (3.1), and comparator (7.2) work in the same way except that the accumulator (6.1) only accumulates data totals from single trunk groups, one at a time. This is accomplished by resetting the accumulator (6.1) at the proper time through reset lead (11.2), i.e., after a whole set of 32 samples have been read out of the main data memory (10.1). Data summary memory (3.1) stores the largest values of these totals and data summary memory (4.1) stores the corresponding sum of squares. Accumulator (6.3), providing totals of busies in all trunk groups together is reset through lead (2.4) which indicates when all groups of 32 samples each have been read into the accumulator. The data summary memories are addressed through leads (1.5) which determine from counter (1.2) which group is currently being summarized (See FIG. 3). Updating of the data summary memories (3.1), (4.1) only occurs, one group at a time, after accumulators (6.1) and (6.2) have summarized the data from the main data memory (10.1). Note that data summary memories (3.1) and (4.1) storing $$\sum_i X_i \text{ and } \sum_i X_i^2$$

(sums of busies and sums of squares of busies respectively) are updated together through lead (7.4) and data summary memories (3.2) and (4.2) also storing $$\sum_i X_i \text{ and } \sum_i X_i^2$$

are updated through lead (8.2). The additional data summary memories (3.2) and (4.2) relate to the second of two updating modes described below. (See FIG. 3).

The system has two modes of updating the data summary memories (3.1), (4.1) and (3.2), (4.2). Depending upon the specific application, updating can occur for each trunk group individually when the current accumulated trunk group sum of busy trunks from the main data memory exceeds the largest previously stored sum, yielding the group busy hour data; or it can occur after the current accumulated sum of all busy trunk measurements for all trunk groups taken together exceeds all the previous sums, yielding the cluster busy hour data. In the latter case accumulator (6.3), comparator (7.1), and latch (9.1) are used in conjunction with flip flop (8.1) as shown in FIG. 3. An update condition (pulse) from comparator (7.1) would set flip flop (8.1) through lead (8.3) so that updating of all groups will occur on the next read cycle. Since each read cycle requires 60/32 minutes (minutes per hour divided by samples per hour), updating would occur within approximately a period less than the length of an average telephone conversation or holding time from the instant of peak load. Reset of flip flop (8.1) will then occur through lead (2.4) at the completion of the next read cycle. This can be made to occur at any point in the cycle by use of Gating (11.3) (FIG. 2) from read/write counters (1) to the flip flop reset control. Select control (0.2) shown in FIG. 2 can choose which mode of operation is to be used, by connecting either lead (8.2) from flip flop (8.1) or lead (7.3) from comparator (7.2) to the read/write control (7.4) of the data summary memories (3.1), (4.1) as shown in FIG. 2. In FIG. 3, an arrangement is shown where the select control (0.2) in FIG. 2 is not needed, and through the use of two additional data summary memories (3.2) and (4.2), operates in both modes of operation simultaneously. The need and basis for these two modes of data collection in typical applications is fairly complex and is briefly discussed at the beginning of this specification describing the concept of the invention.

Finally, it should be noted (see FIG. 2) that a data summary memory (4.1) operating with (trunk group) accumulator (6.2) and squaring decoder (5.3) tracks the sums of squares of the busies stored in the main memory (10.1). It (4.1) is updated along with the other data summary memory (3.1) from the same control leads (7.4) that control the read/write input of the data summary memory (3.1). Note that the squaring decocer (5.3) is a Read Only Memory (ROM) whose binary outputs are the squares of the binary inputs (address leads). For example, a binary input of 0011 (or 3) would have an output 1001 (or 9). The use of such decoders is well known in the art, and in effect the ROM memory is serving a table lookup function for squaring binary numbers.

Referring back to the enumeration of the types of measurements made by the invention on the sampled trunk leads, one sees that hourly sums and sums of squares of busies are stored. The data obtained from this device must then be mathematically processed in order to obtain estimates of offered traffic expressed in erlangs or CCS units of traffic. Note that measurements can be made on all the trunks or on a limited portion of the trunks. The calculaton of offered loads will follow the same process in both cases. While the mathematical tools to be presented here are needed to arrive at the desired results, it is believed that their primary significance with respect to this device is to further illustrate the novelty and usefulness of the concept of the device to measure the mean and variance of the carried load directly, and to obtain the offered traffic load from such measurements.

It is first important to note that the mean and variance are derived from the sums and sums of squares by the following simple relations:

$$\text{Mean} = \frac{1}{N} \sum_{i=1}^{N} X_i = \overline{X}$$

$$\text{Variance} = \frac{1}{N-1} \sum_{i=1}^{N} (X_i - \overline{X})^2 = \frac{1}{N-1} \left[ \sum_{i=1}^{N} X_i^2 - \frac{1}{N} \left( \sum_{i=1}^{N} X_i \right)^2 \right]$$

where N=number of samples (32 in this case) and $$\Sigma X_i, \Sigma X_i^2$$

is the sum and sum of squares of the 32 sampled busy measurements (elements).

Figure 5B:
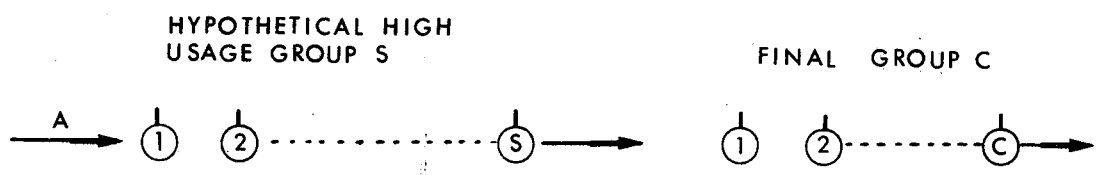

The offered load is rigorously calculated from the mean and variance of the carried load using one of two techniques, depending upon whether the lost-calls-held or lost-calls-cleared assumption is used. The theoretical basis for these assumptions is well established in the literature. This discussion will start with the lost-calls-cleared formulas. Because of the form of the relationships, an iterative procedure must be used in order to calculate the offered load which produces the measured mean and variance on the selected group or subgroup of trunks. The formulas in their standard form find the mean and variance of the load carried on a selected set of C measured trunks given the mean (where variance and means are equal) offered to a trunk group containing the C measured trunks plus a hypothetical number of first choice trunks, S. The problem is depicted in FIG. 5-b. A paper entitled "The Simple Overflow Problem in the Theory of Telephone Traffic," by E. Brockmeyer, appearing in Teleteknik #4, December 1954, gives the detail of the calculation of the mean and variance of the measured load carried by the last choice trunks in the lost-calls-cleared assumption. An iterative procedure is used to calculate the offered load from this mean and variance.

To actually carry out the complex calculation the following procedure has been developed. First, using the so-called Rapp approximation, the offered traffic A and number of trunks S on a hypothetical trunk group is estimated from the measured mean and variance assuming that the mean and variance approximate total overflow traffic from the hypothetical trunk group. The relationships used are shown below:

A = offered traffic (to S trunks of hypothetical group)
a = mean of measured traffic
v = variance of measured traffic
z- = variance to mean ratio of measured traffic
S = number of trunks (Note that this hypothetical number of first choice trunks is based on the so-called equivalent random traffic theory so that the original offered load A can be expressed with equal mean and variance)

$$A \simeq v + 3z(z - 1)$$

$$S \simeq \frac{v + 3z(z-1)}{(a+z-1)/(a+z)} - a - 1$$

A further approximation of A is as follows:

$$A \simeq \frac{(z-1+a)(S+1+a)}{(a+z)}$$ where S is obtained as above and rounded down to the nearest integer.

The approximate values for A (offered traffic) and S (number of total trunks are used as a starting point in iterating to the exact values, using the procedure and relationships below:

(1) Using the calculated approximate value of S (number of total trunks in hypothetical trunk group), the offered traffic is iterated in the Erlang formula below until the traffic matching the mean of the measured traffic is found.

Measured mean of traffic $=\mu=A|E(c+S,A)-E(S,A)|$ where $S+c$ is the total number of trunks in the group, where S is the number of trunks in the hypothetical group and c is the additional number of trunk leads actually measured.

(2) The number of trunks S is incremented and the variance on the C measured trunks is calculated using the more complex and exact Brockmeyer formulas to be shown until the calculated variance matches the measured variance.

(3) The values of offered traffic A and the number of trunks, S resulting from the iteration in (2) above are thus both determined from the measured mean and variance.

Summary presentation of the detailed complex relationships used in step (2) above which give both the mean and variance of traffic on a selected subgroup of trunk first require the definition of several polynomials as follows:

$$S_r^m(A) = \sum_{v=0}^{m} \frac{A^{m-v}}{(m-v)!} \binom{r-1+v}{v} \quad (1)$$

where $S_r^m = 0$ if m or r<0, $$S_r^o = 1, S_o^m = \frac{A^m}{m!}, S_r^m = S_r^{m-1} + S_{r-1}^m$$

$$L_r = \frac{1}{S_1^{n+q} S_r^n} \sum_{v=r}^{q} \binom{V-1}{r-1} S_o^{n+v} \quad (2)$$

$$T_k = P_{o,k} = \sum_{r=k}^{c} (-1)^{r-k} \binom{r-1}{k-1} L_r \quad (3)$$

$$P_{jk} = \sum_{x=o}^{q-k} (-1)^x T_{k+x} \binom{k+x}{k} S_{k+x}^{j-x} \quad (4)$$

where $$\binom{n}{k} = \frac{n!}{k!(n-k)!}$$

The variance is then given as follows:

-continued $$\text{where the mean} = \mu = \frac{\sum_{j=0}^{s} \sum_{k=1}^{c} k^2 P_{jk} - \mu^2}{\sum_{j=0}^{s} \sum_{k=1}^{c} nP_{jk} = A[E(S,A) - E(c+S,A)]}$$

with $E(S,A)$ defined as $$\frac{\frac{A^s}{S!}}{\sum_{j=0}^{s} \frac{A^j}{j!}}$$

where A=offered traffic, c=#measured trunk leads (last choice), and c+S=total trunk leads (measured and nonmeasured). Substitutions are made using $T_k$, $L_r$, and $S_r^m$ to get $P_{jk}$ and the mean and variance on c measured trunks is calculated from $P_{jk}$ using the above relationships. The iterative procedure outlined above is used to get S and A from the mean and variance measured.

The solution in the case of the lost-calls-held assumption was presented by R. R. Mina at the Eighth International Teletraffic Congress convening at Melbourne Australia in November 1976. The following two expressions are used in the expression for the mean and variance.

$$q(a) = \sum_{i=a}^{\infty} \frac{e^{-A} A^i}{i!}$$

$$B(a) = q(a) - \frac{a}{A} q(a+1)$$

$\mu$ = mean measured load = $A[B(S) - B(c+S)]$
$\sigma^2$ = variance of measured load =

$$\mu \left[ \frac{q(s) - q(c+s)}{B(s) - B(c+S)} - \frac{(c+s)B(s) - SB(c+s)}{B(S) - B(c+s)} + c + (A-\mu) \right]$$

$A$ = offered traffic
$S+c$ = total # trunks
$c$ = # measured trunks

An iterative procedure is again required with A and S stepped through a series of values until the measured mean and variance is obtained.

While the invention has been particularly shown and described with reference to preferred embodiments thereof, it will be understood by those skilled in the art that various changes in form and details may be made therein without departing from the spirit and scope of the invention.

What is claimed is:

1. A telephone traffic measuring and storage system used to monitor the traffic flow on selected measuring leads of trunk groups on the basis of the trunk group busy hour and the trunk group cluster busy hour by measuring, compressing, and sorting trunk group busy statistics, facilitating the calculation of the mean and variance on a selected group of trunks and rejecting data sums for the measurement interval where currently measured traffic intensity is less than the peak traffic intensity, where the traffic is measured over many successive intervals, comprising:

a main data memory means for storing the number of busy trunks at periodic sampling times over the measurement interval for separate measured trunk groups, counting means driven by clocking means where outputs of said counting means address the main data memory means in the memory read and write modes and provide for system timing functions, a multiplexing means for selecting which set of outputs of the counting means will address the main data memory means, connecting means between counting means and control input of said multiplexing means, and between counting means and read/write control of main data memory means to switch main data memory between read and write mode, a trunk group multiplexing means for selecting the leads from the various measured trunk groups, which connect to a decoding means for counting busy trunks and converting this into a number expressed in binary form, an accumulating means connected to the output of the main data memory means for totaling the number of trunks busy in each trunk group for the periodic set of measurements stored in the main data memory means over each successive measurement interval, a decoding means connected to the output of the main data memory means for squaring said outputs in binary form and whose squared output is connected to an accumulating means for totaling the sums of the squares of the numbers of trunks busy in each trunk group for the periodic set of measurements stored in the main data memory means, data summary memory means addressed by counting means and whose data inputs are connected to outputs of said accumulating means, comparator means for comparing the accumulated sums of measurements in accumulating means with the previously stored sums in data summary memory means which cause updating of the data summary memory means through connecting means between output of said comparator means and write control of data summary memory means when latest accumulated sums exceed previously stored sums, gating means connected to counting means for resetting accumulator means after data from each trunk group has been accumulated, connecting means between clocking means and the accumulate enable control of accumulating means, connecting means between counting means and address inputs of data summary memory means to cause sums of measurements for a particular group stored in the main data memory to be stored in a corresponding location in the data summary memory means.

2. The device described in claim 1, further including additional accumulating means connected to said main data memory means so that all measurements stored in the main data memory means are read out and accumulated and additional comparator means for comparing the resulting accumulated total in said additional accumulating means with data stored in a latch memory means so that replacement of the data stored in said latch memory means with said accumulated total is triggered by a signal from an output control of said additional comparator means which is generated when said accumulated total exceeds the data stored in said latch memory means, and flip-flop means whose set control is connected to said output control of said additional comparator means and whose reset control is connected to said counting means so that reset occurs at a predetermined point in the counting cycle.

3. The device in claim 1 wherein the main data memory means stores trunk busies for sampled measurement intervals during the most recent hour of measurement and wherein the sums and sums of squares of said measurements are stored in said data summary memory means where output is in a form which facilitates the calculaton of the mean and variance of said measurements and the corresponding offered load.

4. In a telephone traffic measuring system, a device for storing and retrieving data for a set of trunk groups where data for each group consists of a set of sampled elements produced from periodic measurement with one element at a time from each trunk group entered into the memory but with all elements of each group extracted from the memory in sequence comprising:.

A memory means with addressing means, data input means, and data output means and read/write control means, for storing a set of sample data elements for each of a set of trunk groups.

a serially connected set of two binary counting means for controlling addressing for the reading of data from the memory means with said read counting means driven by the system clock means, a further set of two binary counting means controlling addressing for the writing of data into the memory means, with said write counting means driven by the read counting means, a multiplexing means with two input means, an output means, and a control means, selecting whether the read counting means or write counting means is connected to the addressing means of the memory means, connecting means, from the read/write control of the memory means and from the multiplex control to the lowest order bit of the write counting means so that the memory means will be placed in the write mode after each read cycle and so that the multiplexer will select outputs of write counting means to address the memory means during the write cycle, trunk group multiplexing means with input means, output means, and input select means to select measuring leads from separate trunk groups in sequence, decoding means for counting the number of busy trunks, connecting means from the lowest order leads of the write counting means to the input select means of the trunk multiplexing means so that the data from each trunk group being measured is placed in a specified block location in the memory for the given trunk group, connecting means from the trunk group multiplexing means to the decoding means and from the decoding means to the input means of the memory means, gating means connected to the counting means for performing external control functions associated with data summarization of measurements stored in said memory means.

5. The device described in claim 4 wherein the set of measured data elements for each trunk group are stored in data blocks so that reading from the memory allows all data elements from each data block to be retrieved before retrieving from the next block and so that writing into the memory allows only one measured element to be stored at a time per data block from each trunk group in sequence before storing the next measured element.

6. The device described in claim 4 wherein one complete writing cycle for updating the main data memory occurs in an hour and one complete read cycle for extracing and summarizing data in the main data memory is followed by the writing of a single element in the write cycle, so that the main data memory means stores at any given time data for the most recent hour of measurement, and so that data more than one hour old in the main data memory means is replaced by new data.

7. In a traffice measuring system, an on-line data compression and sorting device which reduces a set of periodic samples over a measurement period temporarily stored in a main data memory means into the sum of said measurements which are stored in a separate summary data memory means only when new accumulated sums exceed all previously stored sums, so that the data summary means only stores the largest measured sum during the periods of measurement comprising:

a main data memory means storing a set of sampled measurements made over a one hour period, counting means for controlling the addressing of the main data memory means and connecting means between the counting means and addressing inputs of the main data memory means, accumulating means with data input and output means, and accumulate enable and reset control means for summing the measured samples, summary memory means with data input and output means and read/write control means, storing said sums from the accumulating means and addressed by said counting means, comparator means for comparing stored sums in the summary memmory means with those in the accumulating means with connecting means from data input ports of the comparator means to the output means of the accumulating means and summary memory means, connecting means from the read/write control of the data summary memory means to the comparator means, connecting means from the enable input of the accumulating means to clocking means so that updated data accumulating can occur after each element is read from the main data memory, gating means with connecting means from the counting means indicating when all elements from the main data memory means have been read and accumulated in the accumulating means, connecting means from the gating means to the reset control on the accumulating means to reset the accumulating means after all samples have been read from the main data memory means, a squaring decoding means, including input and output means, for squaring sampled measurements stored in said main data memory means;

a second accumulating means including data input and output means, accumulate enable means, and reset control means, for summing said squared sampled measurements;

an additional summary memory means, including read/write input control means and data input/output means, for storing said squared values;

connecting means between the read/write control means of said summary memory means and said comparator means to control the updating of stored summary memory measurements;

connecting means between said reset control means of said second accumulating means and said gating means to reset said second accumulating means after all samples have been read from said main data memory means;

connecting means between accumulate enable means of said second accumulating means and said clocking means so that data accumulation can occur when each element is read from said main data memory means; and connecting means between data output of said main data memory means and said squaring decoding means and between said output means of squaring decoding means and said second accumulating means.

8. The device described in claim 7 wherein said gating means is used to detect the presence of a maximum count in said counting stages in order to provide a pulse to reset said accumulating means after each group of elements has been read from said main data memory means.

9. In a telephone traffic measuring device, a system comprising: main data memory means for storing data consisting of trunk busy counts for a plurality of trunk groups at periodic intervals over the most recent measurement period and summary data memory means for storing sum for each trunk group separately and for all trunk groups together and sums of squares of said counts, between successive updates of said main data memory means, with calculating and selecting means for calculating and selecting peak sums and associated sums of squares over the time of operation to insert in the summary data memory means, and clock means connected to counting means to provide for addressing of said memory means and for timing of said calculating means.

10. The system described in claim 9 further including multiplexing means allowing a single measuring unit to measure a plurality ot trunk groups by selecting trunk groups for measurement at prescribed times and decoding means for counting number of busy trunks in said trunk groups where a selected subset of trunk lead from each trunk group are connected to the input of the trunk group multiplexing means.

11. The device described in claim 9, wherein said calculating and selecting means comprise: accumulating means, comparator means, and summary memory means with connecting means between said main data memory and said accumulating means and between said accumulating means and said summary memory means, wherein said comparator means compares outputs of said accumulating means and said data summary memory means and allows data from said accumulating means to be written into said summary memory means when the data in said accumulating means represents a larger numerical value than the data in said summary memory means, wherein reset of said accumulating means is controlled by said clock means through a gating means.

12. In a traffic measuring system a device for accumulating sums and sums of squares of server occupancy measurements over a sliding measurement interval which may be used to facilitate the calculation of the mean and variance of the traffic comprising:

a main data memory means including address input means and data output means for storing a set of sampled measurements which are periodically updated;

a first accumulating means including reset input means and accumulate enable means whose input is connected to said data output of said main data memory means for accumulating sum of values stored in said main data memory means;

a squaring means whose input means is connected to data output means of said main data memory means for squaring values stored in said main data memory means;

a second accumulating means including reset input means and accumulate enable means whose input is connected to output means of squaring means for accumulating squares of values stored in said main data memory means;

a clock means connected to said first and second accumulate enable means of said first and second accumulating means to trigger accumulation of values stored in said main data memory means; and addressing means driven by said clocking means where outputs of said addressing means are connected to address input means of said main data memory means to select those values from said main data memory means whose sums and sums of squares are to be calculated.

13. The device described in claim 12 wherein the addressing means is used to read out a block of stored data and to update successively between readouts all data elements from said data block, so that said main data memory means always contains data from the most recent period, said memory addressing system comprising:

a counting means including lower and upper stages, driven by said clock means to provide for timing;

a multiplexing means including first and second input means connected to lower and upperstages of counting means, respectively, and select input control means for selecting whether said upper or lower stages of counting means will be applied to output of said multiplexing means;

main data memory means described in claim 12 further including read/write control input means;

connecting means between upper stages of said counting means and first input means of said multiplexing means;

connecting means between lower stages of said counting means and second input means of said multiplexing means;

connecting means between output of said multiplexing means and addressing means of said main data memory means so that said main data memory means is addressed by said lower counting stages during memory reading and by said upper counting stages during memory writing;

connecting means between low order output of said upper stages of counting means to said read/write control means of said main data memory means; and connecting means between low order output of said upper stages of counting means and select input control means of said multiplexing means.

* * * * *